(12) United States Patent
Wang et al.

(10) Patent No.: US 12,117,892 B2
(45) Date of Patent: Oct. 15, 2024

(54) AUTOMATED ERROR TRIAGE SCORING

(71) Applicant: Microsoft Technology Licensing, LLC, Redmond, WA (US)

(72) Inventors: Wenjing Wang, Redmond, WA (US); Youquan Su, Redmond, WA (US); Zi Ye, Redmond, WA (US); Ya Lin, Bellevue, WA (US); Shirley F. Tan, Sammamish, WA (US); Ashwin Shrinivas, Bellevue, WA (US); Mathieu Baptiste Demarne, Seattle, WA (US); Grant R. Culbertson, Duvall, WA (US); Yvonne Mckay, Woodinville, WA (US); Thomas R. Michaels, Jr., Bellevue, WA (US); Barton K. Duncan, Philadelphia, PA (US); Zhirui Yuan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/878,375

(22) Filed: Aug. 1, 2022

(65) Prior Publication Data
US 2024/0036964 A1 Feb. 1, 2024

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0781* (2013.01); *G06F 11/0784* (2013.01); *G06F 11/0706* (2013.01)

(58) Field of Classification Search
CPC .. G06F 11/079; G06F 11/076; G06F 11/0781; G06F 11/0784; G06F 18/23
See application file for complete search history.

(56) References Cited

U.S. PATENT DOCUMENTS

| 9,086,960 B2 * | 7/2015 | Mahindru ............... G06F 11/34 |
| 2013/0179736 A1 * | 7/2013 | Gschwind ........... G06F 11/3006 |
| | | 714/E11.029 |

(Continued)

OTHER PUBLICATIONS

Chen, Junjie et al., How Incidental are the Incidents? Characterizing and Prioritizing Incidents for Large-Scale Online Service Systems, 2020, IEEE (Year: 2020).*

(Continued)

*Primary Examiner* — Marc Duncan
(74) *Attorney, Agent, or Firm* — Holzer Patel Drennan (57) ABSTRACT

A computing system automatically manages error reports. Each error report specifies an error that occurred within a subsystem of the computing system. A received error report is added into a root cause grouping. Each root cause grouping contains error reports having error types traceable to a same root cause. A deployment time at which the subsystem corresponding to the error report was deployed within the computing system is determined. A severity score for the root cause grouping is generated as a function of the deployment time. The severity score inversely correlates to a time period length between the deployment time and the occurrence time of the error. The root cause grouping is assigned to a ranked error container of a plurality of ranked error containers based on the generated severity score. Each ranked error container contains root cause groupings having severity scores within a specified score range.

20 Claims, 5 Drawing Sheets

(56) References Cited

U.S. PATENT DOCUMENTS

| | | | |
|---|---|---|---|
| 2017/0083390 A1* | 3/2017 | Talwadker | G06F 11/0772 |
| 2019/0007282 A1* | 1/2019 | Hsieh | G06F 11/34 |
| 2021/0240774 A1* | 8/2021 | Bikumala | G06N 3/08 |
| 2022/0206886 A1* | 6/2022 | Srivastava | G06F 11/079 |
| 2023/0055527 A1* | 2/2023 | Majithia | G06F 11/0772 |

OTHER PUBLICATIONS

Sohn, Joengju et al., Empirical Evaluation of Fault Localisation Using Code and Change Metrics, 2019, IEEE (Year: 2019).*

* cited by examiner

AUTOMATED ERROR TRIAGE SCORING

BACKGROUND

In a computer maintenance operation, a large number of error reports (also referred to as "bug reports") can be received from various sources. Error reports can indicate hardware or software problems within the computing system. Typically, such error reports relating to a given application, service, and/or hardware system are received into a single reporting queue and processed on a first-in-first-out basis by support personnel of the software or hardware provider. However, different errors inherently may have different levels of importance/impact/risk to the provider and/or the customer, and a first-in-first-out basis does not adequately manage these different levels.

SUMMARY

The described technology provides for automatically managing error reports for a computing system. Each error report specifies an error that occurred within a subsystem of the computing system. A received error report is added into a root cause grouping of a plurality of root cause groupings. Each root cause grouping contains error reports having error types traceable to a same root cause. A deployment time at which the subsystem corresponding to the error report was deployed within the computing system is determined. A severity score for the root cause grouping is generated as a function of the deployment time. The severity score inversely correlates to a time period length between the deployment time and the occurrence time of the error. The root cause grouping is assigned to a ranked error container of a plurality of ranked error containers based on the generated severity score. Each ranked error container contains root cause groupings having severity scores within a specified score range.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

In computing, a crash occurs when a computing subsystem, such as a software application or related hardware, stops functioning properly and exits. Example crashes are the result of a software or hardware bug, such as accessing invalid memory addresses, incorrect address values in the program counter, buffer overflow, overwriting a portion of the affected program code due to an earlier bug, executing invalid machine instructions (an illegal opcode), or triggering an unhandled exception.

When a subsystem (e.g., software and/or hardware) of a computing system crashes, the computing system can output an error report ("bug report") to a support system to facilitate debugging efforts. For example, an error report may include a "crash dump," which contains a static memory snapshot of one or more applications or subsystems in the computing system. An error report may also specify an error that occurred within a subsystem of the computing system, an error type or root cause failure corresponding to the error, and an occurrence time of the error. Error reports corresponding to errors that are traceable to the same root cause of failure are collected into a root cause grouping (e.g., a root cause bucket) for debugging by support personnel.

In large computing systems (e.g., a cloud-computing environment, a cloud-based database system), thousands of error reports may be pending at any time, with additional error reports being received over time. Resource limitations, among other factors, can limit the ability of the support personnel to address each of the error reports quickly. Accordingly, the described technology automatically collects, processes, and ranks error reports (and/or the root cause buckets corresponding to the error reports) in an effort to prioritize resource allocation and timing for individual errors. In this manner, the computing system is adapted to triage the error reports and to allocate them into ranked error containers based on severity scores generated on various factors for each root cause bucket. The support personnel can be assigned to one or more ranked error containers so that resources are assigned to best resolve the root causes impacting the performance of the computing system. By analogy, the described technology is similar to a vehicle monitoring system that collects error reports from the vehicle's various subsystems and organizes and communicates the error reports according to the root cause of failure.

Moreover, the described technology scores the severity of the root causes based on monitored factors and ranks the root causes based on the severity scores. In various implementations, severity scoring is based on one or more of the following for each root cause: crash counts, impacted cluster counts, impacted application counts, abnormal crash counts spike per train, abnormal crash count trend/spike per bucket, and cooling factors relating to the time since the crashed system was deployed. For example, if a root cause bucket corresponds to a recent deployment (e.g., referred to as a "deployment train"), the severity score generated for the bucket is weighted more heavily than for a root cause bucket corresponding to an older deployment based on a time decay effect—the more recent deployments are expected to introduce more severe errors than older deployments (e.g., the older deployed subsystems have had more time to be monitored and debugged for severe crashes than the more recently deployed subsystems). In at least one implementation, the time decay effect is applied as a weighting that is inversely correlated to a time period length between the deployment time of the deployment train and the occurrence time of the error, although other applications may be employed.

The described technology performs automated error triage scoring, which automatically assigns a score to individual error reports and allows the corresponding errors to be ranked and assigned based on their importance/impact/risk (collectively "severity"), for example. As used herein and in common usage, the term "triage" refers to assigning degrees of urgency or severity to a particular issue. In many scenarios, errors can result in hardware/software crashes that can impact various aspects of an enterprise's business, whether internal or external. Using such severity scoring, errors having higher levels of severity ("higher ranked errors") can be handled earlier and/or by different support teams than errors having lower levels of severity ("lower ranked errors").

In contrast to a first-in-first-out approach or even a manual evaluation of individual error reports, the described technology can automatically prioritize more severe error reports, without error-prone and subjective manual intervention, using deterministic factors to compute severity scores. Based on these severity scores, individual error reports can be assigned to ranked error containers (e.g., ranked error containers) from which they can be extracted, analyzed, and processed. Furthermore, severity scoring can be applied to incoming error reports in real-time, intermittently, or periodically so that time-based patterns and system impact may be evaluated to better triage error reports.

In some implementations, error reports arising from the same root cause failure or related root cause failures are grouped into root cause groupings called "buckets." All or most error reports include a signature associated with a particular type of error, and error reports sharing the same error type signature (or potentially, closely related error type signatures) are grouped into the same bucket. For example, multiple error reports indicating a NULL_POINTER_READ are collected into a single bucket, while multiple error reports indicating CPP_EXCEPTION_FAILED_ASSERTION are collected into a different bucket. In some implementations, different error types can correspond and/or contribute to the same root cause failure. Therefore, error reports for different error types can be collected into the same bucket. In this manner, error reports indicating the same or related root cause failure may be evaluated together.

In many scenarios, an error report for software and/or hardware is likely to contain additional information that can characterize the error and the system state prior to, during, and/or after the error. For example, if the error resulted in a system crash, the error may include a kernel memory dump containing the state of all the memory in use by the kernel at the time of the crash. The error report may also include the state of other components in the system, such as the contents of microprocessor registers, sensor data (e.g., thermal sensors, vibration sensors, power monitors), peripheral state information, etc. An example error triage scoring engine can ingest the information included in the error report, compute an error triage score based on this information, assign the score to the error report, and pass the error report to a ranked error container. Based on the score and/or ranking of each error report, a report assignment engine can then assign error reports from one or more of the ranked error containers to individual support personnel. Alternatively, support personnel can select an error report from one of the ranked error containers based on its ranking.

In various implementations, the automated scoring considers different triage factors, including without limitation one or more of error frequency, the number of applications/regions/enterprises/customers impacted by the error, the time since the software and/or hardware was deployed, the number and/or versions of the software/hardware are impacted by the error, and spikes and/or trends in similar or related errors. If newer error reports are received for similar or related errors, their scores are scored and ranked as deployment recency, spikes, trends, and other error factors are considered in the scoring and ranking computations. In this manner, the more recent error reports are added to higher ranked containers and are therefore more likely to be addressed more quickly.

Likewise, resources (e.g., personnel, hardware) can be better allocated according to the score and/or rankings. For example, a higher ranked error can be assigned to a support person with a shorter queue and/or a more experienced support person than a lower ranked error. As such, error reports can be automatically classified into ranked error containers of reports (e.g., ranging from most severe errors to least severe errors). Accordingly, the automatic scoring of each error report also allows for the automated distribution of error reports for assignment to support personnel. In some scenarios, personnel can also be dynamically moved from lower ranked errors to higher ranked errors to reduce the negative impacts the errors have on the enterprise's business.

As such, the described technology includes a system that monitors error reports generated by constituent and/or connected hardware and/or software subsystems, automatically evaluates (e.g., scores) the corresponding errors, and ranks the errors for support processing and intended resolution. The errors can then be assigned to support systems and personnel based on these rankings to reduce the negative impacts the errors have on the system operations.

Figure 1:
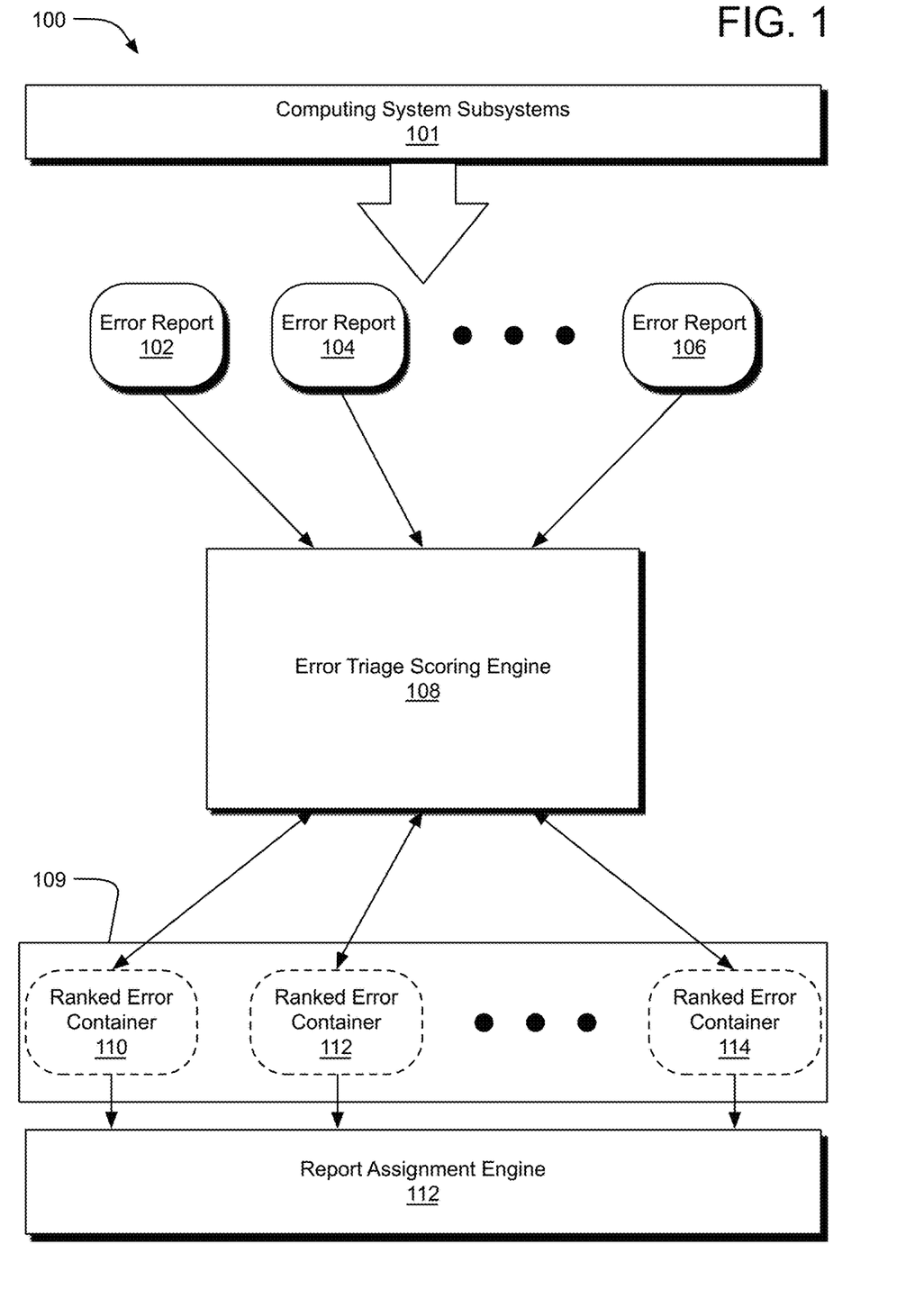
FIG. 1 illustrates a computing system for automated error triage scoring.

FIG. 1 illustrates a computing system 100 for automated error triage scoring. Error reports (e.g., an error report 102, an error report 104, and an error report 106) from computing system subsystems 101 are delivered over time to an error triage scoring engine 108. As described previously, each error report includes information to assist in the triage scoring operation and the subsequent support operations relating to the error characterized in the error report. For example, the error report may include without limitation a kernel memory dump, a source location of the error (e.g., the system, software, and/or facility where the error occurred), a user identifier, a timestamp, and other related information. The error reports are collected into an error report container 109 and grouped into root cause groupings or "buckets." Each root cause grouping collects error reports for which the corresponding error can be traced to the same or similar root cause.

The error triage scoring engine 108 scores these error reports and collects them into ranked error groupings (also referred to as "ranked error containers") in the error report container 109 based on the score computed for each error report. In some implementations, the error reports corresponding to the same root cause failure are tagged or parameterized into logical groups in the error report container 109. In other implementations, the error reports can be allocated to separate storage containers. As an example of a logical grouping approach, if the error scores range from zero to 2.0, then each error report container is allocated to a portion of that range—a ranked error container 110 is configured to group error reports with scores from zero to less than 0.1, a ranked error container 112 is configured to group error reports with scores from 0.1 to less than 0.2, and a ranked error container 114 is configured to group error reports with scores from 0.9 to 2.0. If the score for an individual error report changes over time (e.g., due to the time decay effect or other factors, such as a detected spike or trend in the error), then the error report may be moved to a different ranked error container.

In most support systems, the volume of error reports received over time precludes the manual scoring of individual error reports, particularly scoring based on the error triage scoring described herein. For example, a support organization may receive thousands of error reports in a single day. Moreover, the time decay effect of the described error triage scoring involves changes in the scoring of individual error reports over time, compounding the complexity of scoring such a large volume of error reports. Manual scoring is inadequate because a human is too slow, too unreliable, and too subjective to provide accurate and consistent scoring and ranking for a large number of error reports.

Accordingly, the error triage scoring engine 108 can collect error reports and update score calculations for previously received error reports in near real-time as other error reports are received and the time decay effect is iteratively applied. For example, an old error report may be scored lower than other error reports for a time and therefore be added to a lower ranked error container. However, if similar error reports are received in a recent spike or a rising trend, then the score associated with the old error report may be increased such that the error report is moved to a higher ranked error container.

Error reports assigned to the ranked error containers may then be processed by support personnel, for example, based on an assignment of individuals to different ranked error containers based on their corresponding severity score ranges. Furthermore, the error reports and buckets associated with individual ranked error containers may be viewed in a user interface of a computing system, such as a dashboard illustrated in FIG. 3.

Figure 2:
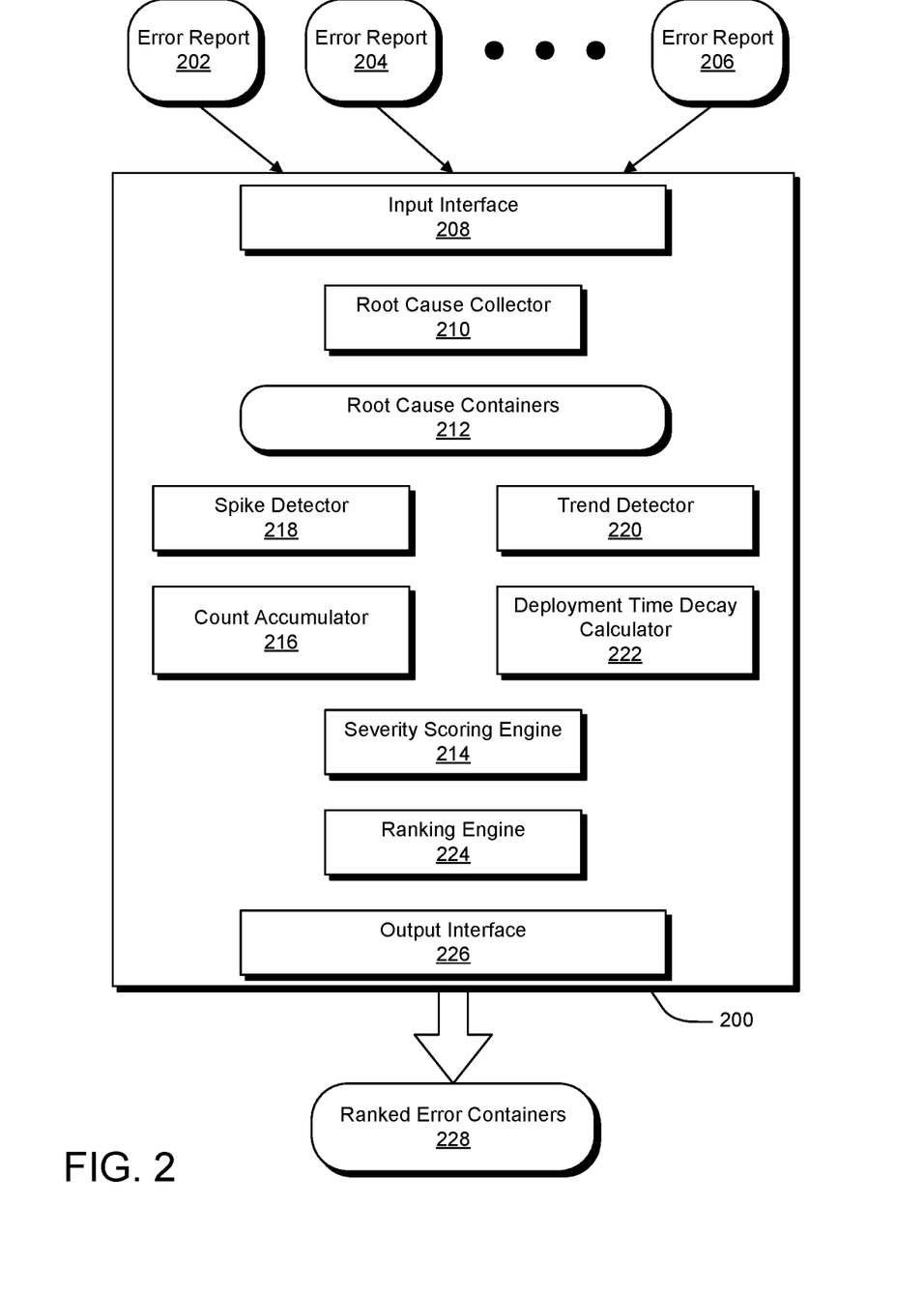
FIG. 2 illustrates components of an example error triage scoring engine.

FIG. 2 illustrates components of an example error triage scoring engine 200. Error reports (e.g., an error report 202, an error report 204, and an error report 206) are received from computing system subsystems. One or more of the error reports includes a static memory snapshot (e.g., including a call stack) of the subsystem captured in response to the error and specifies an error that occurred within a subsystem of the computing system, an error type corresponding to the error, and an occurrence time of the error. The error report may also specify a time of deployment of the subsystem reporting the error, although this information may also be obtained via other data records.

The error reports are received through an input interface 208 of the error triage scoring engine 200, which may be implemented via a combination of software, circuitry, and physical components, such as a network adapter or data bus. The error triage scoring engine 200 typically collects error reports for a specified collection period, such as daily, into root cause groupings corresponding to the types of errors specified in each error report. In some implementations, the error reports may be collected by a root cause collector into root cause groupings and processed in real-time or in near real-time. Each error report received from the subsystems of the computing system is added by a root cause collector 210 to a root cause grouping of a plurality of root cause groupings 212 according to an error type specified in the error report. Each error type can be traced back to a root cause failure. In many scenarios, the same root cause failure, such as a stack overflow, can produce slightly different error reports. Therefore, each root cause grouping includes error reports traceable to the same or similar root cause failure.

A severity scoring engine 214 of the error triage scoring engine 200 generates a severity score based on various combinations of factors. In one implementation, as shown in Equation 1 below, the severity score is a function of the root cause grouping B (referred to as "bucket" in Equation 1) and the monitoring time period t (e.g., based on daily periods):

$$Score(B,t) = \Sigma W_{train} \Sigma_{\{Crashes, Clusters, Apps\}} (\tilde{X} + \frac{1}{3} \times I_{SpikePerTrain} + \max(I_{SpikePerBucket}, I_{TrendPerBucket})) \quad (1)$$

Equation 1 includes a cooling factor ($W_{train}$) that operates as a weighting factor, described in more detail below. The cooling factor applies a weight to the second summation, which sums crash-related factors over three crash count types in this example—raw crash counts, impacted cluster counts, and impacted application counts. Within the parenthetical of the second summation, each crash count type factor (X), abnormal crash counts spike per train for that crash count type, abnormal crash count trend/spike per bucket for that crash count type) are combined, and then the contributions from each crash count type are summed and weighted. It should be understood that other equations may be used in scoring severity associated with a given root cause and time period. The leftmost summation indicates that the scores may be summed over multiple deployment trains.

In Equation 1, the three crash count types are represented by the variable X within the second summation, although different combinations of one or more crash count types may be employed. Such crash count types may include without limitation (1) the number of times the error reports are collected into the same bucket during the collection period ("raw crash counts"), (2) the number of computing clusters of the computing system that were impacted by the errors in the same bucket ("impacted cluster count"), (3) the number of applications of the computing system that were impacted by the errors in the same bucket ("impacted application count"), and/or (4) other crash-count-related factors. In various implementations, "clusters" refer to the hardware and software infrastructures that hosts SQL databases or other computing and/or storage functionality (including one or more replicas), and "application" refers to the software that is operating on clusters, such as the SQL database software that operates on the computing and storage functionality. For example, a given error type (or its root cause) may cause 10 instances of an SQL database software to crash, as reflected by an impacted application count equaling ten, whereas the same error type (or its root cause) may cause 40 computer/storage clusters (on which the SQL database software runs) to crash, as reflected by an impacted application count of 40.

Over time, a crash count accumulator 216 of the error triage scoring engine 200 accumulates the crash counts corresponding to the supported crash count types. In some implementations, the crash count accumulator 216 normalizes the counts of each crash count type (e.g., the raw crash counts, the impacted cluster counts, impacted application counts), such as between zero and 1.0, inclusive, to avoid skewing the severity score too heavily based on any one of these count parameters. In such implementations, for an individual bucket B (a root cause grouping) containing error reports during the time period t, the normalized crash count factors for each crash type count X (e.g., raw crash count, impacted cluster count, impacted application count) are represented in Equation 1 as the normalized factor $$\tilde{X} = \min\left(\frac{X_{count}}{P99(X_{count})}, 1\right),$$

where P99(·) is the 99$^{th}$ percentile of the corresponding count.

With the counts for each crash count type being represented as X (or as $\tilde{X}$, if normalized), a spike detector 218 of the error triage scoring engine 200 computes the second operand in the parentheses (e.g., $I_{SpikePerTrain}$) corresponds to an abnormal crash counts spike per train factor for each crash count type. The first occurrence of new buckets is defaulted as a spike signal. For each bucket, the spike detection algorithm evaluates the bucket's crashing history for a specified period of time (e.g., the past 30 days) to detect abnormal spikes in crashes for a given deployment train. The abnormal crash counts spike per train factor is represented by a Boolean variable generated from a spike detection algorithm to identify whether a given deployment train results in an abnormally high number of crashes or affects an unusually large number of clusters and apps in the same bucket within a specified period of time. In one implementation, a time series decomposition algorithm is applied because it is simple, easy to use, and the results are comparable with more complex algorithms. In Equation 1, the abnormal crash count trend/spike per bucket factor is weighted by a third, although other static or dynamic weightings may be used. Example abnormal crash count trend/spike per bucket detection algorithms may include without limitation:

Time Series Decomposition: This algorithm detects abnormal spikes along a time series of samples. For example, series_decompose_anomalies(CrashCounts, 3, −1, 'linefit'). The spike anomaly is based on if the residual (after extracting baseline, seasonality, and trend components) is outside of the interquartile range with K=3.

MAD score: Modify the Z-score to use the median. Therefore, the algorithm is more robust to outliers (as shown in Equation 2). If the modified Z-score is larger than some threshold, it will signal as a spike.

$$\text{Modified } Z - \text{Score} = \frac{X_i - \text{Median } (X_i)}{1.4826 \times \text{Median } (|X_i - \text{Median } (X_i)|)} \quad (2)$$

Thresholding Algorithm (moving Z-score): This algorithm is based on the principle of dispersion—if a new datapoint is a given x number of standard deviations away from some moving mean, the algorithm signals (also called z-score). The algorithm is very robust because it constructs a separate moving mean and deviation, such that signals do not corrupt the threshold. The algorithm takes 3 inputs: lag=the lag of the moving window, threshold=the z-score at which the algorithm signals, and influence=the influence (between 0 and 1) of new signals on the mean and standard deviation.

The spike detector 218 and a trend detector 220 of the error triage scoring engine 200 compute the third operand in the parentheses (e.g., max($I_{SpikePerBucket}$, $I_{TrendPerBucket}$)), which corresponds to an abnormal crash count trend/spike per bucket factor for each crash count type. The abnormal crash counts trend/spike per bucket factor includes a Boolean variable generated by the spike detector 218 from a spike detection algorithm to identify whether a bucket results in an abnormally high number of crashes or affects an unusually large number of clusters and apps within a specified period of time, agnostic to the deployment train associated with the subsystem. The spike portion of the abnormal crash counts trend/spike per bucket factor may be computed using a similar spike detection algorithm as the abnormal crash counts spike per train factor or some other detection algorithm.

The abnormal crash counts trend/spike per bucket factor also includes a Boolean variable generated by the trend detector 220 from a trend detection algorithm to identify whether there is a trend pattern (e.g., a rising trend pattern) as a gradual change within the specified period of time (monotonic increase or non-monotonic increase), which is a different scenario from spike detection in which there is a sudden large spike detected within the specified period of time. Example abnormal trend detection algorithms may include without limitation Simple Linear Regression (Kusto): series_fit_line if the fitting result in R-square is greater than 0.5 (e.g., linear correlation>0.7) and the slope is greater than 0 (e.g., positively correlated), the algorithm will detect it as a rising trend.

Spearman Rank correlation and Significant test: This algorithm detects positive rank correlation, and the corresponding significant test shows how strong the correlation is. The thresholds used in an example algorithm are set as Spearman Rank correlation>0.8 and p-value<0.0.

Each root cause grouping or bucket is scored based on one or more crash-count-related factors, which may be weighted. In various implementations, a time delay effect or "cooling factor" is computed as a weight ($W_{train}$) by a deployment time decay calculator 222. The cooling factor relates to the length of time between the occurrence of the error and the deployment of the impacted subsystem (e.g., the release time of the deployment train corresponding to the affected subsystem). The longer the length of time between the error and the deployment train, the less heavily the root cause grouping corresponding to that root cause is weighted when computing the severity score for the root cause grouping. The time delay effect pertaining to each deployment train, therefore, reduces the severity score as the length of time since the subsystem's deployment increases, although other representations of the time delay effect may be implemented.

In one implementation, the weight per train ($W_{train}$) accommodates the observation that there are some crashes from old trains that are not correlated with current ongoing deployment. As such, a higher weight is assigned to the newer deployment trains, where more active development and debugging work is anticipated. For example, on 2021-10-09, dump crashes were observed from 3 Trains: T60, T59, and T58, with a higher number indicating newer trains. Then the weights assigned to the i-th train would be $$\frac{e^{-i}}{\sum_{i=1}^{n} e^{-i}},$$

in this example, the weights assigned for $$[T60, T59, T58] = \left[\frac{e^0}{\sum_{i=1}^{n} e^{-i}}, \frac{e^{-1}}{\sum_{i=1}^{n} e^{-i}}, \frac{e^{-2}}{\sum_{i=1}^{n} e^{-i}}\right] = [0.66, 0.25, 0.09].$$

As discussed, the cooling factor acts as a weighting value on other scoring factors that may be applied in the severity score computation. As shown in Equation 1, the cooling factor is applied as a weight to a summation across the crash-count-related factors discussed below. For each type of crash-related factor contemplated in Equation 1, a normalized crash count factor, an abnormal crash spike, and an abnormal crash trend are summed within the rightmost parentheses, and their respective severity score contributions are then summed, as represented by $\Sigma_{\{Crashes, Clusters, Apps\}}(\cdot)$.

The cooling factor then weights the result of this summation to yield the severity score for the root cause grouping B for the time period t.

A ranking engine 224 receives the bucket's computed severity score from the severity scoring engine 214 and distributes the error reports corresponding to the bucket through an output interface 226 to one of a set of ranked error containers 228. From here, a report assignment engine can transmit the ranked error reports or allow access to the ranged error reports by appropriate support personnel.

Figure 3:
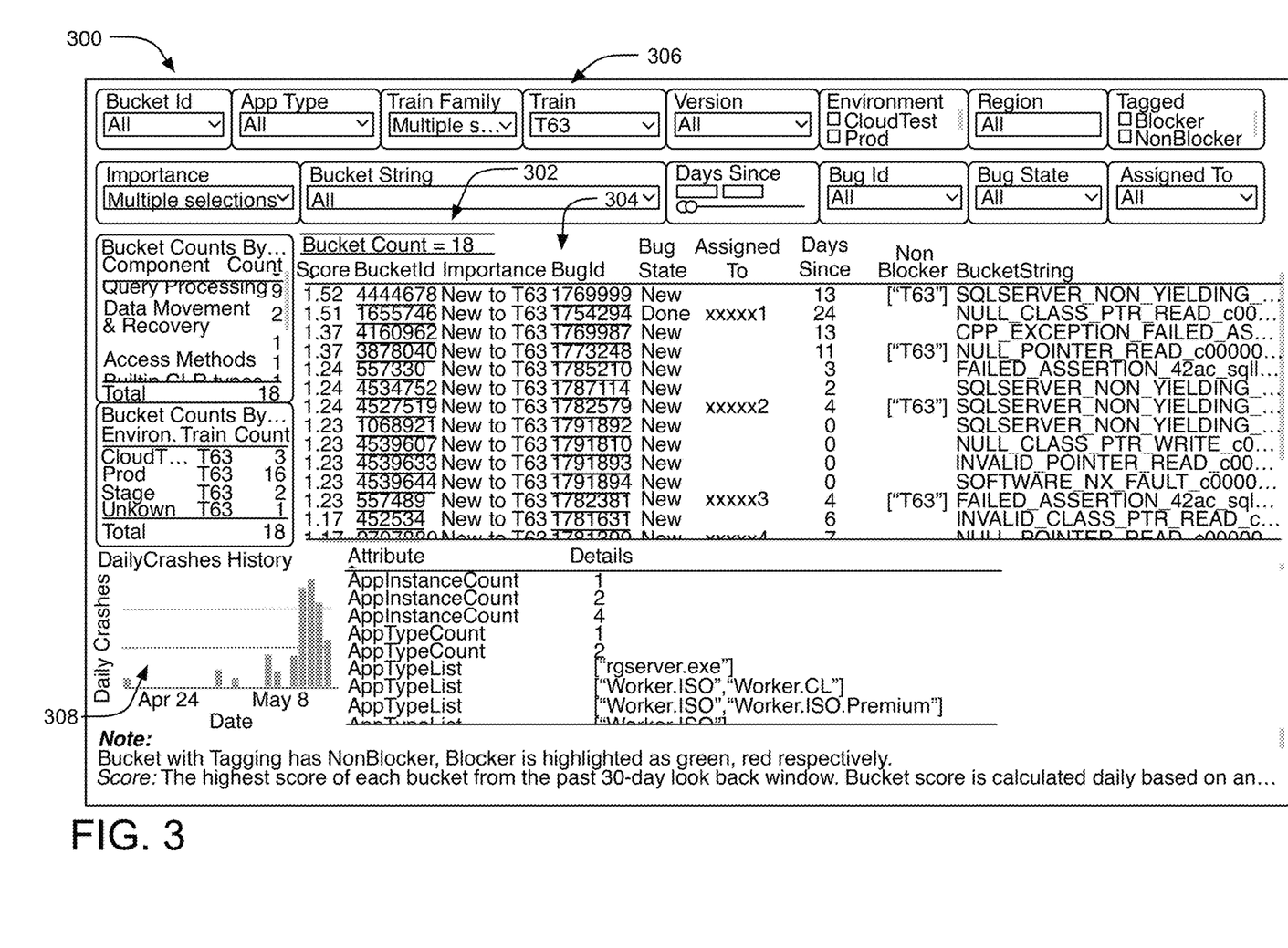
FIG. 3 illustrates an example dashboard for automated error triage scoring.

FIG. 3 illustrates an example dashboard 300 for automated error triage scoring. A label 302 indicates that 18 buckets are represented in the bucket list 304 of severity scores and related information. A first column of the list indicates the severity score for the bucket in each row. A second column indicates a bucket identifier associated with the errors sharing the same root cause failure (e.g., the errors collected into the bucket). A third column indicates an Importance designation, stating that the displayed buckets are "new to T63," where "T63" identifies a deployment train to which the errors correspond, and in these cases, the buckets indicate errors that are newly detected for the T63 deployment train. It is noted that the filter control 306 filters the bucket list 304 to include only those buckets corresponding to "T63," but buckets for other deployment trains may be displayed with a different Train setting in the filter control 306.

A fourth column of the bucket list 304 indicates a bug indicator associated with each bucket. A fifth column indicates a state of the bug (e.g., the error), such as "new," "in progress," "done," etc. A sixth column indicates a person to whom the bucket was assigned for debugging. A seventh column indicates the number of days since error reports for errors in each bucket were first received. An eighth column indicates whether the bucket is being tagged by exports as blocking the train deployment. A ninth column indicates a string describing the root cause failure corresponding to the bucket.

A Daily Crash History chart 308 displays the daily crashes (along the X-axis) monitored by the system over time (along the Y-axis). In another implementation, the example dashboard 300 includes a column indicating the historical rank of the bucket.

Figure 4:
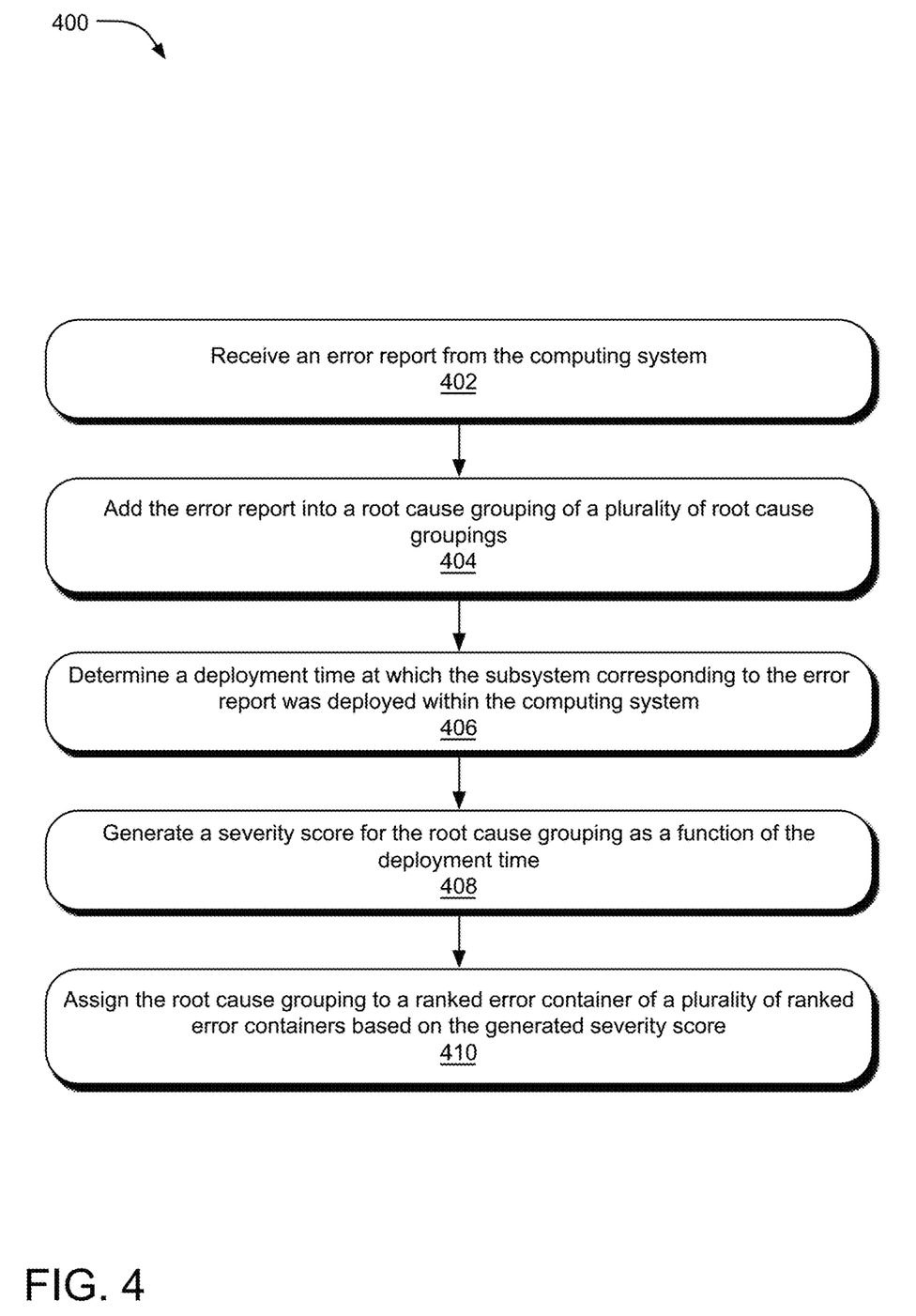
FIG. 4 illustrates example operations for managing error reports for a computing system using automated error triage scoring.

FIG. 4 illustrates example operations 400 for managing error reports for a computing system using automated error triage scoring. A receiving operation 402 receives an error report from the computing system. A collection operation 404 adds the error report into a root cause grouping of a plurality of root cause groupings. Each root cause grouping contains error reports having error types traceable to a same root cause. A determining operation 406 determines a deployment time at which the subsystem corresponding to the error report was deployed within the computing system.

A scoring operation 408 generates a severity score for the root cause grouping as a function of the deployment time. The severity score inversely correlates to a time period length between the deployment time and the occurrence time of the error. A ranking operation 410 assigns the root cause grouping to a ranked error container of a plurality of ranked error containers based on the generated severity score. Each ranked error container contains root cause groupings having severity scores within a specified score range.

Figure 5:
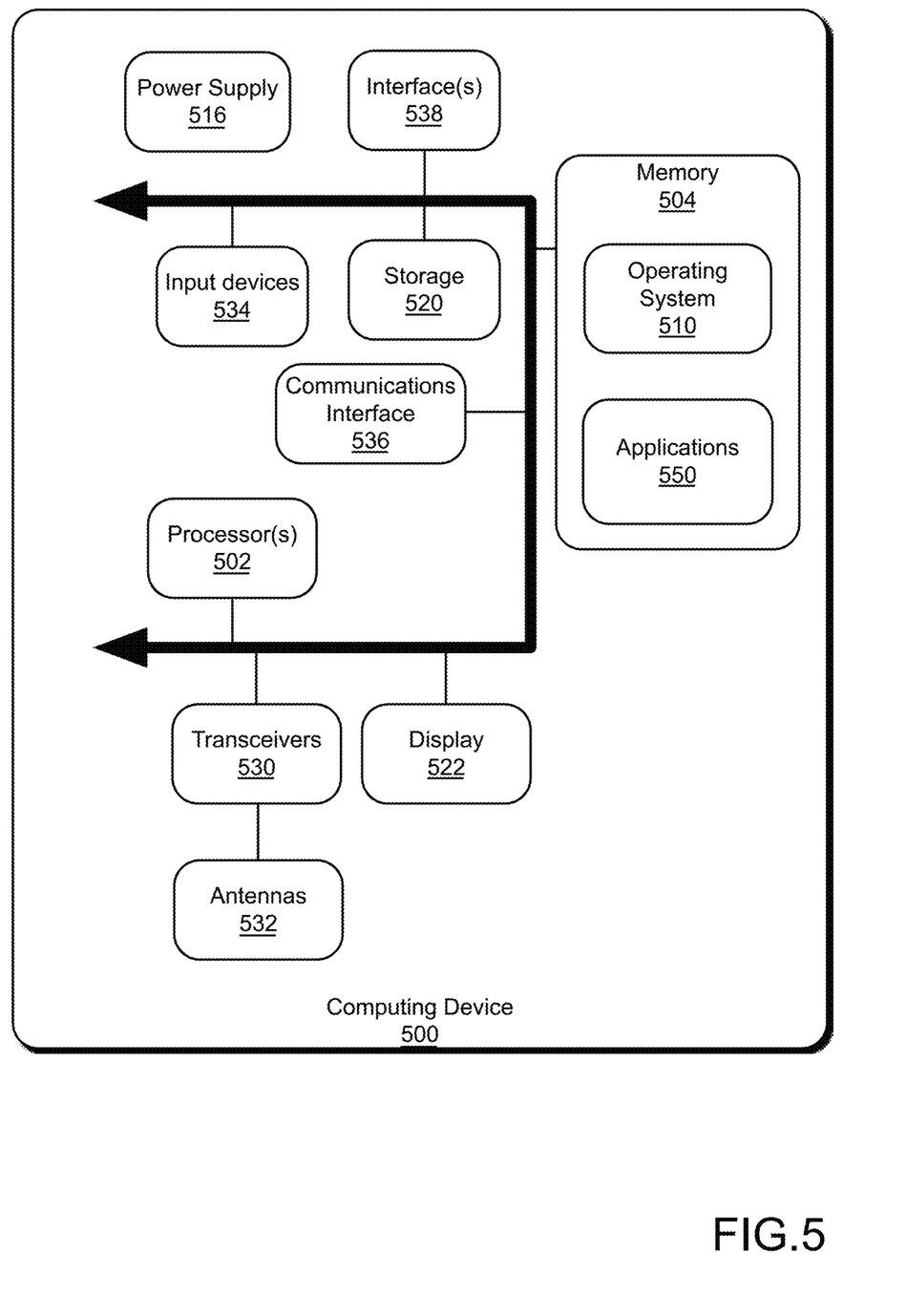
FIG. 5 illustrates an example computing device for use in automated error triage scoring.

FIG. 5 illustrates an example computing device for use in automated error triage scoring. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550, an input interface, an output interface, an error triage scoring engine, a root cause collector, a spike detector, a trend detector, a count accumulator, a deployment time decay calculator, a severity scoring engine, and other modules are loaded into the operating system 510 on the memory 504 and/or storage 520 and executed by processor(s) 502. The storage 520 may store error reports, root cause groupings, severity scores, ranked error report containers, and other data and be local to the computing device 500 or may be remote and communicatively connected to the computing device 500. In one implementation, an input interface, an output interface, an error triage scoring engine and its other components, and other modules may include circuitry to perform intended functions. In particular, in one implementation, components of the error triage scoring engine may be implemented entirely in hardware or in a combination of hardware circuitry and software.

The computing device 500 includes a power supply 516, which is powered by one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (such as a network adapter or an I/O port, which are types of communication devices. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In some aspects, an example method of managing error reports for a computing system is provided. Each error report specifies an error that occurred within a subsystem of the computing system. The example method includes receiving an error report from the computing system; adding the error report into a root cause grouping of a plurality of root cause groupings, each root cause grouping containing error reports having error types traceable to a same root cause; determining a deployment time at which the subsystem corresponding to the error report was deployed within the computing system; generating a severity score for the root cause grouping as a function of the deployment time, wherein the severity score inversely correlates to a time period length between the deployment time and an occurrence time of the error; and assigning the root cause grouping to a ranked error container of a plurality of ranked error containers based on the generated severity score, each ranked error container containing root cause groupings having severity scores within a specified score range.

In some aspects, another example method of any preceding method is provided, wherein the severity score is further based on a detected spike in crash counts over time.

In some aspects, another example method of any preceding method is provided, wherein the severity score is further based on a detected spike in trending counts over time.

In some aspects, another example method of any preceding method is provided, wherein the severity score is further based on a normalized count parameter corresponding to at least one of a crash count, an impacted cluster count, and an impacted application count.

In some aspects, another example method of any preceding method is provided, further including transmitting an error report from the ranked error container to a support personnel user.

In some aspects, another example method of any preceding method is provided, wherein the received error report includes a static memory snapshot of the subsystem captured in response to the error.

In some aspects, another example method of any preceding method is provided, wherein each root cause grouping includes error reports for errors occurring in a specified occurrence period and traceable to the same root cause.

In some aspects, an example system for managing error reports for a computing system. Each error report specifies an error that occurred within a subsystem of the computing system. The example system includes one or more hardware processors; an input interface executable by the one or more hardware processors and configured to receive an error report from the computing system, wherein the error report indicates an error type of the error; a root cause collector executable by the one or more hardware processors and configured to add the error report into a root cause grouping of a plurality of root cause groupings, each root cause grouping containing error reports having error types traceable to a same root cause; a deployment time decay calculator executable by the one or more hardware processors and configured to determine a deployment time at which the subsystem corresponding to the error report was deployed within the computing system; a severity scoring engine executable by the one or more hardware processors and configured to generate a severity score for the root cause grouping as a function of the deployment time, wherein the severity score inversely correlates to a time period length between the deployment time and an occurrence time of the error; and a ranking engine executable by the one or more hardware processors and configured to assign the root cause grouping to a ranked error container of a plurality of ranked error containers based on the generated severity score, each ranked error container containing root cause groupings having severity scores within a specified score range.

In some aspects, another example system of any preceding method is provided, wherein the severity score is further based on a detected spike in crash counts over time.

In some aspects, another example system of any preceding method is provided, wherein the severity score is further based on a detected spike in trending counts over time.

In some aspects, another example system of any preceding method is provided, wherein the severity score is further based on a normalized count parameter corresponding to at least one of a crash count, an impacted cluster count, and an impacted application count.

In some aspects, another example system of any preceding method is provided, further including: an output interface executable by the one or more hardware processors and configured to transmit an error report from the ranked error container to a support personnel user.

In some aspects, another example system of any preceding method is provided, wherein the received error report includes a static memory snapshot of the subsystem captured in response to the error.

In some aspects, another example system of any preceding method is provided, wherein each root cause grouping includes error reports for errors occurring in a specified occurrence period and traceable to the same root cause.

In some aspects, one or more example tangible processor-readable storage media embodied with instructions are provided for executing on one or more processors and circuits of a computing device a process for managing error reports for a computing system. The example process includes receiving an error report for a subsystem of the computing system, wherein the received error report includes a static memory snapshot of the subsystem captured in response to an error and indicates an error type and an occurrence time of the error; adding the error report into a root cause grouping of a plurality of root cause groupings, each root cause grouping containing error reports having error types traceable to a same root cause; determining a deployment time at which the subsystem corresponding to the error report was deployed within the computing system; generating a severity score for the root cause grouping as a function of the deployment time, wherein the severity score inversely correlates to a time period length between the deployment time and the occurrence time of the error; and assigning the root cause grouping to a ranked error container of a plurality of ranked error containers based on the generated severity score, each ranked error container containing root cause groupings having severity scores within a specified score range.

In some aspects, one or more example tangible processor-readable storage media of any preceding media is provided, wherein the severity score is further based on a detected spike in crash counts over time.

In some aspects, one or more example tangible processor-readable storage media of any preceding media is provided, wherein the severity score is further based on a detected spike in trending counts over time.

In some aspects, one or more example tangible processor-readable storage media of any preceding media is provided, wherein the severity score is further based on a normalized count parameter corresponding to at least one of a crash count, an impacted cluster count, and an impacted application count.

In some aspects, one or more example tangible processor-readable storage media of any preceding media is provided, wherein the process further includes: transmitting an error report from the ranked error container to a support personnel user.

In some aspects, one or more example tangible processor-readable storage media of any preceding media is provided, wherein each root cause grouping includes error reports for errors occurring in a specified occurrence period and traceable to the same root cause.

In some aspects, an example system of managing error reports for a computing system is provided. Each error report specifies an error that occurred within a subsystem of the computing system. The example system includes means for receiving an error report from the computing system; means for adding the error report into a root cause grouping of a plurality of root cause groupings, each root cause grouping containing error reports having error types traceable to a same root cause; means for determining a deployment time at which the subsystem corresponding to the error report was deployed within the computing system; means for generating a severity score for the root cause grouping as a function of the deployment time, wherein the severity score inversely correlates to a time period length between the deployment time and an occurrence time of the error; and means for assigning the root cause grouping to a ranked error container of a plurality of ranked error containers based on the generated severity score, each ranked error container containing root cause groupings having severity scores within a specified score range.

In some aspects, another example system of any preceding system is provided, wherein the severity score is further based on a detected spike in crash counts over time.

In some aspects, another example method of any preceding method is provided, wherein the severity score is further based on a detected spike in trending counts over time.

In some aspects, another example system of any preceding system is provided, wherein the severity score is further based on a normalized count parameter corresponding to at least one of a crash count, an impacted cluster count, and an impacted application count.

In some aspects, another example system of any preceding system is provided, further including: means for transmitting an error report from the ranked error container to a support personnel user.

In some aspects, another example system of any preceding system is provided, wherein the received error report includes a static memory snapshot of the subsystem captured in response to the error.

In some aspects, another example system of any preceding system is provided, wherein each root cause grouping includes error reports for errors occurring in a specified occurrence period and traceable to the same root cause.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of managing error reports for a computing system, each error report specifying an error that occurred within a subsystem of the computing system, the method comprising:
receiving an error report from the computing system, wherein the error report is assigned to a first ranked error container of a plurality of ranked error containers, each ranked error container containing root cause groupings having severity scores within a specified score range, the first ranked error container corresponds to a first allocated error processing resource, and access to the first ranked error container including the error report is provided to the first allocated error processing resource;

adding the error report into a root cause grouping of a plurality of root cause groupings, each root cause grouping containing error reports having error types traceable to a same root cause;

determining a deployment time at which the subsystem corresponding to the error report was deployed within the computing system;

generating a severity score for the root cause grouping as a function of the deployment time, wherein the severity score inversely correlates to a time period length between the deployment time and an occurrence time of the error;

assigning the root cause grouping to a second ranked error container of the plurality of ranked error containers based on the generated severity score, wherein the second ranked error container corresponds to a second allocated error processing resource and the first allocated error processing resource is different from the second allocated error processing resource; and providing access by the second allocated error processing resource to the second ranked error container of the plurality of ranked error containers based on the root cause groupings and severity scores.

2. The method of claim 1, wherein the severity score is further based on a detected spike in crash counts over time.

3. The method of claim 1, wherein the severity score is further based on a detected spike in trending counts over time.

4. The method of claim 1, wherein the severity score is further based on a normalized count parameter corresponding to at least one of a crash count, an impacted cluster count, and an impacted application count.

5. The method of claim 1, wherein providing access by the second allocated error processing resource comprises:
transmitting the error report from the second ranked error container to a support personnel user.

6. The method of claim 1, wherein the received error report includes a static memory snapshot of the subsystem captured in response to the error.

7. The method of claim 1, wherein each root cause grouping includes error reports for errors occurring in a specified occurrence period and traceable to the same root cause.

8. A system for managing error reports for a computing system, each error report specifying an error that occurred within a subsystem of the computing system, the system comprising:
one or more hardware processors;
an input interface executable by the one or more hardware processors and configured to receive an error report from the computing system, wherein the error report indicates an error type of the error, herein the error report is assigned to a first ranked error container of a plurality of ranked error containers, each ranked error container containing root cause groupings having severity scores within a specified score range, the first ranked error container corresponds to a first allocated error processing resource, and access to the first ranked error container including the error report is provided to the first allocated error processing resource;
a root cause collector executable by the one or more hardware processors and configured to add the error report into a root cause grouping of a plurality of root cause groupings, each root cause grouping containing error reports having error types traceable to a same root cause;

a deployment time decay calculator executable by the one or more hardware processors and configured to determine a deployment time at which the subsystem corresponding to the error report was deployed within the computing system;

a severity scoring engine executable by the one or more hardware processors and configured to generate a severity score for the root cause grouping as a function of the deployment time, wherein the severity score inversely correlates to a time period length between the deployment time and an occurrence time of the error;

a ranking engine executable by the one or more hardware processors and configured to assign the root cause grouping to a second ranked error container of the plurality of ranked error containers based on the generated severity score, wherein the second ranked error container corresponds to a second allocated error processing resource and the first allocated error processing resource is different from the second allocated error processing resource; and a report assignment engine executable by the one or more hardware processors and configured to provide access by the second allocated error processing resource to the second ranked error container of the plurality of ranked error containers based on the root cause groupings and severity scores.

9. The system of claim 8, wherein the severity score is further based on a detected spike in crash counts over time.

10. The system of claim 8, wherein the severity score is further based on a detected spike in trending counts over time.

11. The system of claim 8, wherein the severity score is further based on a normalized count parameter corresponding to at least one of a crash count, an impacted cluster count, and an impacted application count.

12. The system of claim 8, further comprising:
an output interface executable by the one or more hardware processors and configured to transmit the error report from the second ranked error container to a support personnel user.

13. The system of claim 8, wherein the received error report includes a static memory snapshot of the subsystem captured in response to the error.

14. The system of claim 8, wherein each root cause grouping includes error reports for errors occurring in a specified occurrence period and traceable to the same root cause.

15. One or more tangible processor-readable storage media embodied with instructions for executing on one or more processors and circuits of a computing device a process for managing error reports for a computing system, the process comprising:
receiving an error report for a subsystem of the computing system, wherein the received error report includes a static memory snapshot of the subsystem captured in response to an error and indicates an error type and an occurrence time of the error, wherein the error report is assigned to a first ranked error container of a plurality of ranked error containers, each ranked error container containing root cause groupings having severity scores within a specified score range, the first ranked error container corresponds to a first allocated error processing resource, and access to the first ranked error container including the error report is provided to the first allocated error processing resource;
adding the error report into a root cause grouping of a plurality of root cause groupings, each root cause grouping containing error reports having error types traceable to a same root cause;

determining a deployment time at which the subsystem corresponding to the error report was deployed within the computing system;

generating a severity score for the root cause grouping as a function of the deployment time, wherein the severity score inversely correlates to a time period length between the deployment time and the occurrence time of the error;

assigning the root cause grouping to a second ranked error container of the plurality of ranked error containers based on the generated severity score, wherein the second ranked error container corresponds to a second allocated error processing resource and the first allocated error processing resource is different from the second allocated error processing resource; and providing access by the second allocated error processing resource to the second ranked error container of the plurality of ranked error containers based on the root cause groupings and severity scores.

16. The one or more tangible processor-readable storage media of claim 15, wherein the severity score is further based on a detected spike in crash counts over time.

17. The one or more tangible processor-readable storage media of claim 15, wherein the severity score is further based on a detected spike in trending counts over time.

18. The one or more tangible processor-readable storage media of claim 15, wherein the severity score is further based on a normalized count parameter corresponding to at least one of a crash count, an impacted cluster count, and an impacted application count.

19. The one or more tangible processor-readable storage media of claim 15, wherein the process further comprises:

transmitting the error report from the second ranked error container to a support personnel user.

20. The one or more tangible processor-readable storage media of claim 15, wherein each root cause grouping includes error reports for errors occurring in a specified occurrence period and traceable to the same root cause.

* * * * *